(12) United States Patent
Ohnstad et al.

(10) Patent No.: US 8,061,752 B2
(45) Date of Patent: Nov. 22, 2011

(54) MOBILE, ARMOR SPRAY-COATING TRANSFORM STRUCTURE

(75) Inventors: Thomas S. Ohnstad, Salem, OR (US); Russell A. Monk, Salem, OR (US)

(73) Assignee: High Impact Technology, L.L.C., Tigard, OR (US)

( * ) Notice: Subject to any disclaimer, the term of this patent is extended or adjusted under 35 U.S.C. 154(b) by 938 days.

(21) Appl. No.: 11/543,960

(22) Filed: Oct. 4, 2006

(65) Prior Publication Data
US 2007/0090629 A1    Apr. 26, 2007

Related U.S. Application Data

(60) Provisional application No. 60/724,388, filed on Oct. 6, 2005.

(51) Int. Cl.
*B60P 3/14* (2006.01)
(52) U.S. Cl. .................. 296/26.15; 296/24.32
(58) Field of Classification Search ............ 296/26.15, 296/26.04, 26.02, 104, 24.32, 24.33, 36, 296/13, 14
See application file for complete search history.

(56) References Cited

U.S. PATENT DOCUMENTS

| | | | | |
|---|---|---|---|---|
| 2,358,446 | A | * | 9/1944 | Couse ................. 296/24.32 |
| 2,365,940 | A | * | 12/1944 | Couse ................. 296/24.32 |
| 3,777,706 | A | | 12/1973 | Kaufman |
| 4,981,318 | A | * | 1/1991 | Doane et al. ........... 296/182.1 |
| 5,853,215 | A | | 12/1998 | Lowery |
| 5,864,991 | A | * | 2/1999 | Burns ....................... 52/67 |
| 6,177,174 | B1 | | 1/2001 | Legrand |
| 2004/0231703 | A1 | | 11/2004 | McCormick et al. |

* cited by examiner

*Primary Examiner* — Dennis Pedder
(74) *Attorney, Agent, or Firm* — Jon M. Dickinson, Esq.; Robert D. Vantz, Esq.

(57) ABSTRACT

A mobile transform structure having an openable/closeable trailer body which is reversibly transformable between a closed, transportable, tractor-trailer mode and an open, ground-stabilized, spray-booth mode for receiving, and armor spray-coating, a selected surface in a subject wheeled vehicle at the location of that vehicle. The transform structure includes, in addition to the trailer body, a deployable canopy structure useable, with the trailer body open, to form a canopied spray enclosure for receiving a subject vehicle, and a trailer-self-contained, armor spray-coating system operable, when a wheeled vehicle is received in the enclosure, to armor spray-coat a selected surface in that vehicle. The method of the invention includes (a) transporting the closed trailer body to the site of such a vehicle, (b) opening that body at that site to transform it to a spray enclosure adapted for the entering and exiting of such a vehicle, and (c) and within the enclosure, and utilizing an armor spray-coating system which is self-contained on the trailer body, armor spray-coating a received vehicle.

6 Claims, 3 Drawing Sheets

MOBILE, ARMOR SPRAY-COATING TRANSFORM STRUCTURE

CROSS REFERENCE TO RELATED APPLICATION

This application claims priority to prior-filed U.S. Provisional Patent Application Ser. No. 60/724,388, filed Oct. 6, 2005, for "Pop-Up-Deployable, Ground Traveling, Self-Healing Armoring-Surface Application System". The entire disclosure content of this prior provisional application is hereby incorporated by reference.

BACKGROUND AND SUMMARY OF THE INVENTION

This invention relates to the spray-coating of protective armoring shields, or coatings, onto selected exposed surfaces of client wheeled vehicles, such as a client military tanker vehicle, and a client military personnel-carrier vehicle. The invention features a highly mobile, compact, self-contained, ground-traveling system for field-implementing such spray-coating activities. This mobile system is referred to herein as a mobile transform structure having two distinctly different structural modes, one of which is referred to as a tractor-trailer structural mode, with respect to which the transform structure is reversibly transformable, is referred to herein as a spray-booth structural mode. For illustration purposes only, the invention is described and pictured herein in a military setting, wherein it has been found to offer special utility.

Recent progress in the science and art of applying ballistic, up-armoring shield coatings (called armor coatings) to surface areas of military wheeled vehicles has led to various spray-on approaches which apply composite blends of fast-curing armoring/jacketing materials. The present invention, recognizing both the technical importance of these approaches, and the expressed need to make them readily available to myriad, in-the-field military vehicles which are deployed in widely scattered locations, responds to this recognition with a ground-traveling, fully self-contained, vehicular-carried, armoring spray-application system which can be taken to the respective sites of different subject vehicles (client vehicles) having surfaces to be armor-coated.

References made herein to wheeled vehicles is intended to include reference to various kinds of self-propelled, ground-traveling vehicles, including appropriate kinds and styles of track-laying vehicles. The terms "wheeling-in" and "wheeling-put" refer to traveling motions created in such vehicles.

Proposed, according to a preferred embodiment and manner of practicing this invention, is a tractor-pulled, elongate trailer structure including an elongate trailer body formed with lateral side panel assemblies that are hinged for book-cover-like swinging toward and away from one another, generally about axes which parallel the long axis of the trailer body, in order to enable opening and closing of the trailer body during implementation of the invention. The trailer body, in what is referred to herein as a closed condition, is transported to the site of a subject (client) wheeled vehicle having a surface which is to be armor spray-coated. At the site of this subject vehicle, the tractor is uncoupled from the trailer structure and the included trailer body, and the lateral side panel assemblies in the trailer body are swung outwardly and away from one another to open up the trailer body. This opening up activity forms a deck with respect to which an invention-included, and previously stowed, canopy structure, including suitable support hoops and typically a fabric canopy covering material are assembled to define, along with the open trailer body, an open-ended, elongate spray-coating enclosure adapted to receive a "wheeled-in" subject (client) vehicle.

Preferably, by the time the canopy structure is erected with respect to the opened trailer body, the trailer body is in a condition lowered to, and stably supported in a fixed condition, on the underlying ground, with a ramp then deployed adjacent one end of the trailer body which enables wheeling-in and wheeling-out of a subject wheeled vehicle to be armor coated with respect to one or more of its selected, exposed surfaces. Preferably, further, the very same tractor which is used to transport the trailer body to the site of a subject wheeled vehicle, once uncoupled from the trailer structure at the site of such a vehicle, may then be used, if desired, for the actions of wheeling-in and wheeling-out of a subject vehicle relative to the spray-coating enclosure.

Disposed in the overall trailer structure, in a tag-along trailer unit which is coupled to the trailer body adjacent the opposite end of the trailer body from that end which is made accessible for the entrance and exit of a vehicle to be surface coated, is a self-contained spray-coating system. This system includes all necessary coating supplies, conduit structures, valving structures, portable hose-connected spray heads, etc., that make up the self-contained spray-coating system.

The system and methodology proposed by this invention have the distinct advantage of being transportable readily to a variety of locations where vehicles having surfaces which are desired to be armor-coated are located, with all relevant spray-coating apparatus, including an enclosure wherein coating can take place, completely self-contained within a towable trailer structure per se.

The various features and advantages of the invention, some of which have just been suggested, will now become more fully apparent as the descriptions of the system and the methodology of this invention which follow are read in relation to the accompanying drawings.

DESCRIPTION OF THE DRAWINGS

FIG. 2 also illustrates a deployable, but yet undeployed, ramp structure which may be swung into a sloping condition to provide easy wheel-in and wheel-out access for a vehicle which is to be spray-coated.

FIGS. 4 and 5 also show the body of a petroleum-based fuel tanker which has been wheeled into the above-mentioned spray enclosure just prior to a spray-coating operation.

DETAILED DESCRIPTION OF THE INVENTION

Figure 1:
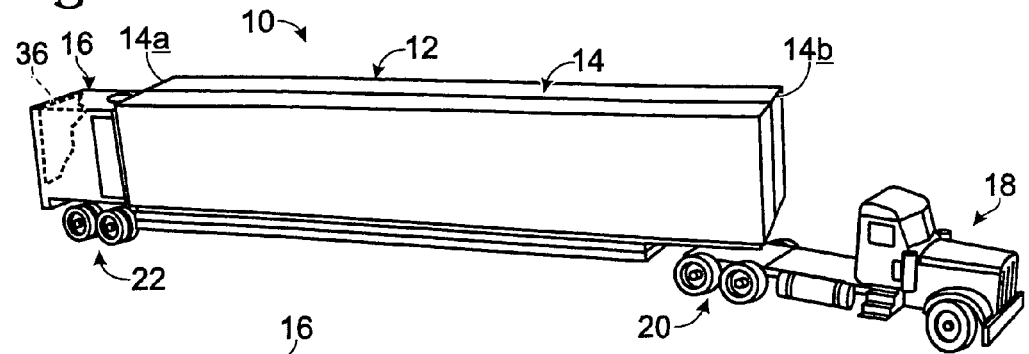
FIG. 1 depicts a mobile transport structure constructed in accordance with a preferred embodiment of the present invention. In this figure, an elongate trailer structure, including an elongate trailer body, which form parts of the invented transport structure, are shown coupled for towing by a tractor, and specifically are shown in what is referred to herein as a closed, tractor-trailer structural-mode condition of the invention.
Figure 2:
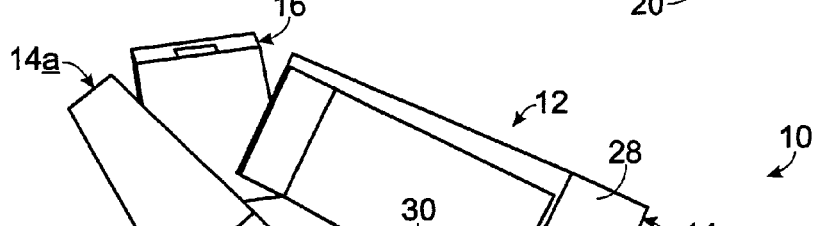
FIG. 2 is a front, isometric view of the same transform structure depicted in FIG. 1 illustrating two lateral panel assemblies in the mentioned trailer body partially unfolded to open that trailer body at the site of a wheeled vehicle having a surface which is to be armor spray-coated.
Figure 3:
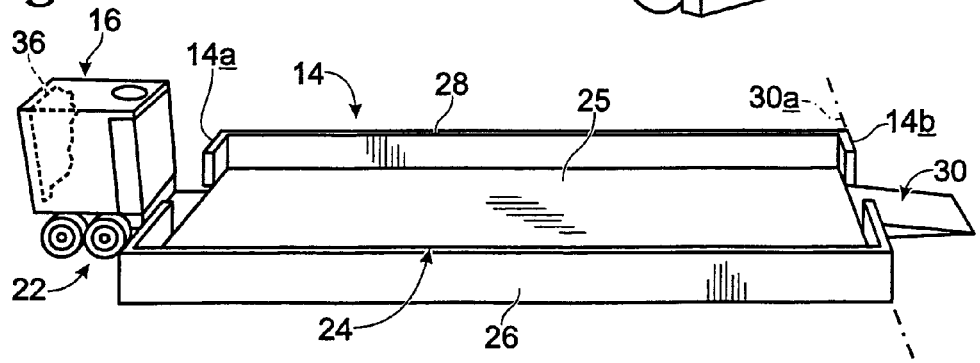
FIG. 3 shows a condition of the structure of the present invention wherein the trailer body, has effectively been lowered to the ground at the site of a wheeled vehicle just before a spray-coating operation is to take place, with the open trailer body being made accessible for wheeling-in and wheeling-out of a vehicle on the mentioned ramp structure, and with all of the structure being stably supported in a fixed or anchored position (condition) on the underlying ground. A canopied spray enclosure is not shown in this figure.

Turning now to the drawings, and referring first of all to FIGS. 1-3, inclusive, indicated generally at 10 is a mobile transform structure made in accordance with a preferred embodiment and manner of practicing the present invention for armor spray-coating a selected surface in a wheeled vehicle, such as a vehicle herein-above, stationed somewhere "out in the field", so-to-speak. Transform structure 10 includes elongate trailer structure 12 having an elongate, main trailer body 14, and a tandem, or tag-along, trailer section, or unit, 16 which resides (is coupled) at the rear end 14a of trailer body 14. The front end of trailer body 14, shown generally at 14b, is coupled through a conventional fifth wheel connection (not specifically shown) to the frame of a tractor 18, which tractor can thus be readily coupled and uncoupled from the trailer body in the usual manners.

In the condition of structural components as such are illustrated in FIG. 1, transform structure 10 is shown in what is referred to herein as a tractor-trailer structural mode, with trailer body 14 illustrated in a closed condition, and with the entire trailer structure being supported for travel over the ground under tow by tractor 18. This condition of the transform structure is referred herein as a ground-traveling, tractor-towable condition. The front end of trailer structure 12 is supported indirectly for transport over the ground by wheels 20 that are carried on the frame in tractor 18. The rear end of trailer structure 12 is supported for such a transport by wheels 22 which are carried on underside of tandem trailer unit 16.

In accordance with the features and practice of the present invention, transform structure 10 is reversibly transformable between the FIG. 1 illustrated tractor-trailer structural mode and another structural mode which is referred to herein as a spray-booth structural mode. In this other mode, the trailer structure is decoupled from tractor 18, with trailer body 14 effectively lowered directly to a condition of contact with, and supported by, the ground wherein it is in a stabilized, ground-anchored condition.

FIG. 2 illustrates what can be thought of as a beginning stage of transformation from the tractor-trailer structural mode, wherein trailer body 14 is in a closed condition, to the just-mentioned spray-booth structural mode, wherein the trailer body becomes opened up. FIG. 2 specifically illustrates initial opening up of trailer body 14.

Thus, and further describing structural features of the invention, trailer body 14 includes a base 24 (see particularly FIG. 3 in the drawings), and a pair of spaced lateral panel assemblies 26, 28 which open and close the trailer body in a kind of reversible clam-shell or book-hinge fashion around, and relative to, a pair of generally horizontal hinge axes 26a, 28a, respectively, which lie along the opposite, lateral, long sides of trailer body base 24 to form an appropriate, generally planar and horizontal, wheeled-vehicle receiving and supporting deck 25.

In FIG. 3 in the drawings specifically, trailer body 14 is shown in a fully opened, or open, stabilized, ground-anchored condition, with panel assemblies 26, 28 including portions which furnish co-extensive lateral extensions of previously mentioned base 24 to create just-above-identified deck 25. Thus, in this figure, the structure of the invention is illustrated in a condition with tractor 18 completely decoupled from trailer structure 12, and specifically, decoupled from what is referred to herein as the front, towing end 14b of trailer body 14. Through any appropriate, conventional mechanism, the details of which form no part of the present invention, the opened trailer body, as pictured in FIG. 3, has been lowered to a condition of stabilized, ground-anchored contact with the underlying ground. Those skilled in the art will recognize that there are many conventionally understood ways in which such lowering and stabilizing, and of course later raising when appropriate, may be accomplished relative to the front and rear ends of trailer body 14, and also relative to tandem trailer unit 16. Another approach for ground stabilization of trailer body 14 could, of course, include the lowering of stabilizing legs, without the lowering specifically of the trailer body, so as to create a ground-anchored condition for the opened trailer body. These conventional approaches to trailer-body ground-stabilization form no part of the present invention, and are therefore not detailed herein.

Additionally included in the transform structure of this invention, in a condition hinged adjacent the front end of trailer-body base 24 for swinging about a generally horizontal axis 30a, is a stowable/deployable ramp, or ramp structure, 30 which, in FIG. 2 is shown in a condition still within the partially open trailer body, and in FIG. 3 in a fully outwardly and sloped deployed condition adjacent trailer body end 14b. As will be seen, ramp 30 is designed to enable the easy wheeling-in and wheeling-out of a wheeled vehicle having surface structure which is to be armor spray-coated in accordance with practice of the invention.

Figure 4:
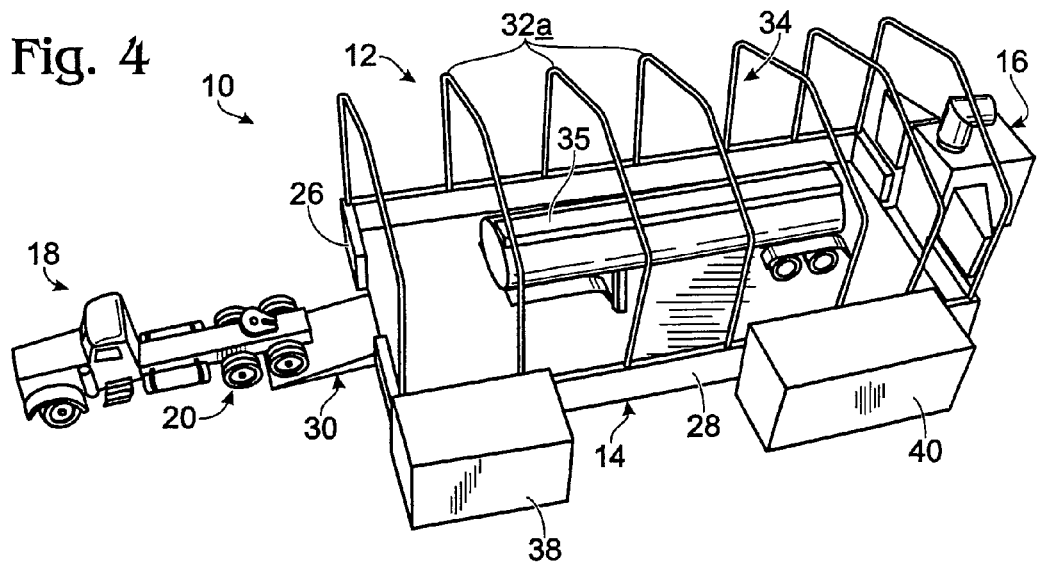
FIGS. 4 and 5 provide different points of view illustrating the structure of this invention in a fully-deployed use condition, with a canopy structure (shown fragmentarily) in place defining an enclosure wherein spray-coating can take place.
Figure 5:
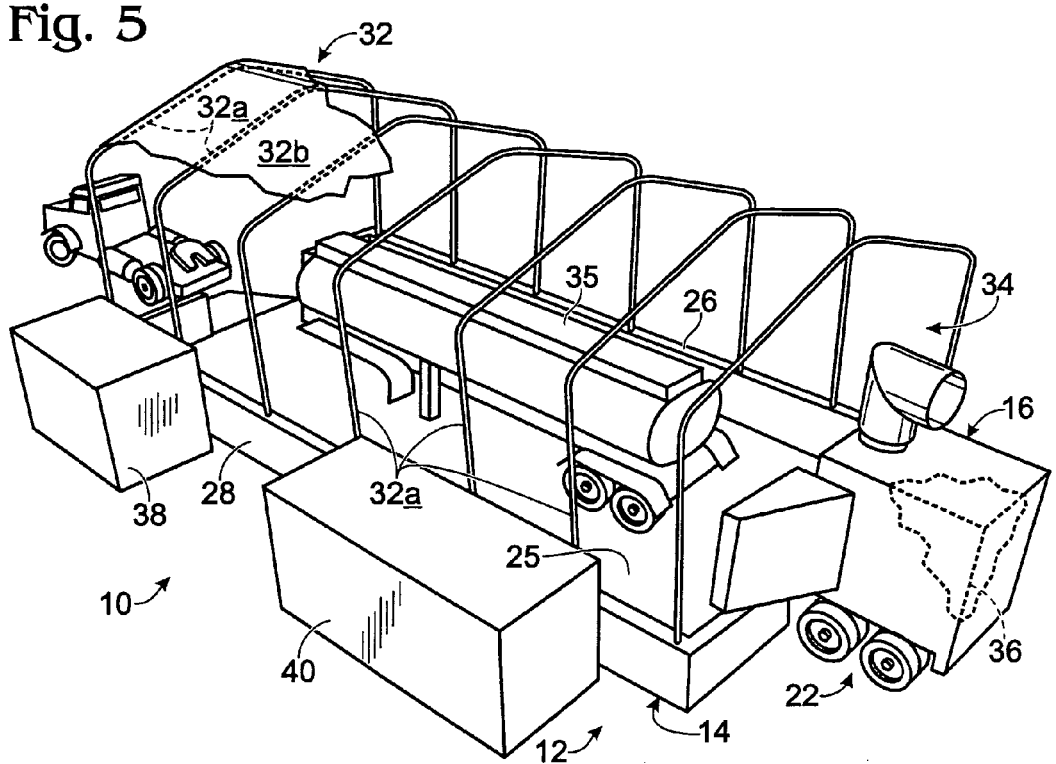
Figure 6:
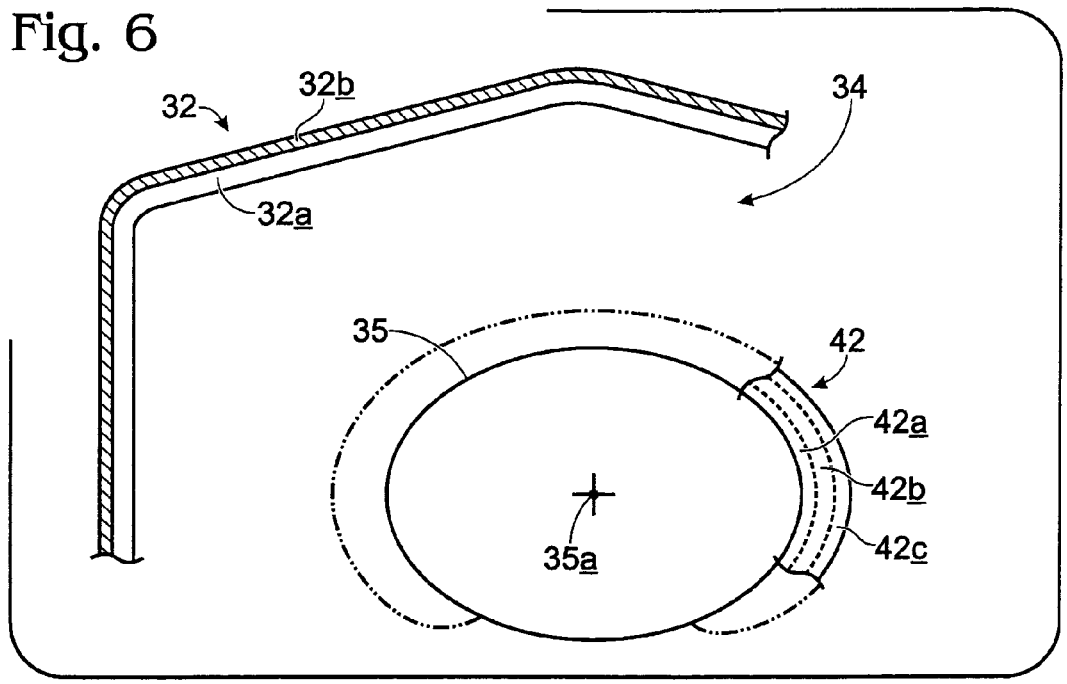
FIG. 6 is a schematic, along-the-long-axis view of the long body of the tanker shown in FIGS. 4 and 5, along with a fragmentary portion of (a) a canopy structure, (b) of a spray enclosure defined partially by this canopy structure, and (c) of a plural-layer, sprayed-on armor coating applied to a major portion of the outside surface of the tanker body (i.e., the fuel-containing body) within the spray enclosure in accordance with practice of the present invention.

Turning attention now to the remaining drawing figures along with those which have already been discussed, further included in the transform structure of this invention is stowable-deployable canopy structure which is indicated generally, but only fragmentarily, at 32 in FIGS. 5 and 6. Canopy structure 32 defines what is referred to herein as an open-ended, canopied spray enclosure 34. More specifically, canopy structure 32, which includes a plurality of longitudinally spaced (relative to the length dimension of trailer body 14) support hoops 32a (see FIGS. 4, 5 and 6) which support a canopy-surface fabric 32b (see FIGS. 5 and 6), collectively with trailer body base 24, and the two lateral platform extensions formed with this base by panel assemblies 26, 28, define spray enclosure 34 (see FIGS. 4, 5 and 6) which is adapted to receive different wheeled vehicles for armor spray-coating of surface areas in these vehicles. In order to expose, for fuller viewing herein, the interior of enclosure 34 in FIG. 4, canopy fabric 32b is omitted from this figure. The hoop and fabric-expanse components of canopy structure 32 are, of course, suitably stowed within trailer structure 12 when that structure is in its tractor-trailer structural mode, as pictured in FIG. 1.

In FIGS. 4 and 5, the tractor-detached trailer body of a petroleum-based fuel tanker is shown at 35, appropriately wheeled into and positioned within enclosure 34 to enable armor spray-coating of the outside, exposed surface areas of this trailer body. In FIG. 6, the long-axial-view outline of the fuel-containing portion of tanker 35 is shown, and is identified with this same reference numeral (35).

Completing a description of the transform structure of this invention as illustrated in the several drawing figures herein, further included in this structure, and specifically contained for the most part in tandem trailer unit 16, is a self-contained armor spray-coating system shown fragmentarily and only schematically in dashed lines at 36 in FIGS. 1, 3 and 5. This spray-coating system includes appropriate reservoirs of armor spray-coating materials, as will be described shortly, conduits, hoses, desired, and any other appropriate auxiliary equipment suitable for enabling walk-around, manual spray-coating of a surface area, or of surface areas, in an enclosure-received wheeled vehicle, such as fuel tanker trailer 35 pictured in FIGS. 4 and 5, and in tank cross-sectional outline in FIG. 6. Auxiliary supplies associated with operation of spray-coating system 36 may also be stored, and/or installed for use, in suitable containers, such as the two shown at 38, 40 in FIGS. 4 and 5, which containers may be carried conveniently within the interior of trailer body 14 when that trailer body is in its closed condition, as pictured in FIG. 1.

While the particular transform structure illustrated and described herein has been designed for implementing manual, walk-around spraying of a wheeled vehicle disposed within enclosure 34, it should be understood that a modified form of the invention could feature a spray-coating armoring system in which a self-contained spray-coating system includes components that become erected within enclosure 34 for automated spray-coating use. However, in order to maximize the wide-ranging versatility invention, and recognizing that a very large variety of wheeled vehicles may be brought into enclosure 34 for armor spray-coating, it is preferable that manual spray-coating be provided for primarily.

Figure 7:
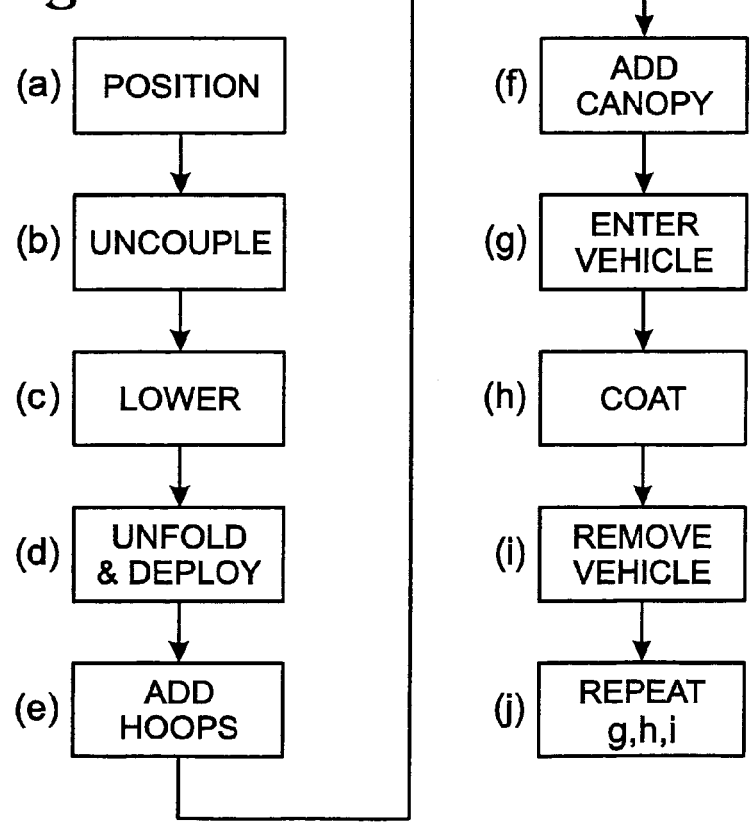
FIG. 7 is a block/schematic diagram generally outlining methodology steps performed during implementation and practice of the present invention.

Focusing attention now especially on FIG. 7 in the drawings, here there are shown ten, word-labeled blocks (a)-(j), inclusive, coupled by unidirectionally pointing interconnecting arrows. These blocks generally illustrate various steps carried out in the practice of the present invention. Thus, and referring to these blocks to describe that practice, transform structure 10, in its tractor-trailer structural mode, is transported to the location of a wheeled vehicle having a surface which is to be armor-coated, and is suitably positioned close by this vehicle (block (a)). With this done, tractor 18 is uncoupled from the trailer structure 12 (block (b)), and trailer body 14 is appropriately lowered to the ground (block (c)), or otherwise treated, to stabilize it and to anchor it effectively in a ground-fixed condition.

Following stabilizing of trailer body 14, panel assemblies 26, 28 and ramp structure 30 are unfolded and swung into deployed conditions and positions (block (d)) so that they, and the base of trailer body 14, have the dispositions clearly illustrated in FIG. 3 in the drawings.

With this accomplished, the hoops and fabric expanse components of canopy structure 32 are appropriately set up with respect to the now unfolded and opened up trailer body (block (e)) so as to form elongate, canopied spray enclosure 34 as seen in FIGS. 4, 5 and 6 in the drawings.

With spray enclosure 34 thus readied, the various appropriate components of armor spray-coating system 36 are deployed from trailer body 14 and tandem trailer unit 16, and preferably utilizing tractor 18, the wheeled body of a vehicle which is to have certain surface areas armor spray-coated in accordance with practice of the invention is wheeled upwardly along ramp 30 into enclosure 34 to attain a position like that shown for tanker trailer 35 in FIGS. 4 and 5 in the drawings. Obviously, if such a wheeled vehicle is self-propelled, it may simply be driven under its own power up ramp 30 and into enclosure 34.

With a wheeled vehicle to be spray-coated properly positioned within enclosure 34, the spray-coating system components are appropriately operated, typically manually, to apply armor spray-coating material to the relevant surface areas, with one or more operators moving easily around the enclosure-received vehicle in walk-around regions provided readily by the unfolded and exposed deck-portions of panel assemblies 26, 28. This spray-coating step of the invention is represented by block (h) in FIG. 7.

In the particular practice of the invention now being described with reference to wheeled vehicle (tanker trailer) 35, and while other kinds of armor spray-coating materials may be utilized, the fuel-tank portion of vehicle 35 is coated with a special three-sub-layer coating, such as that illustrated generally, but only fragmentarily, at 42 in FIG. 6. Coating 42 is applied in a near fully circumsurrounding fashion on the outside of trailer tanker 35 relative to the tanker's fuel tank's long axis which is shown at 35*a* in FIG. 6. The three sub-layers which make up coating 42 in FIG. 6 are shown generally at 42*a*, 42*b*, 42*c*. Dash-double-dot lines are provided in FIG. 6 to illustrate the near circumsurrounding nature of the coating specifically applied to tanker trailer 35. More will be said very shortly about the specific nature of coating 42 which is used herein as an illustration of an armor spray-coating material.

Following full and satisfactory spray-coating, the coated vehicle is wheeled out of the enclosure and down ramp 30 to be returned typically to the ground site where it was first located. This step of the invention is represented by block (i) in FIG. 7.

Finally, if there are more wheeled vehicles to be armor spray-coated at the same subject-vehicle site, the steps which are represented by blocks (g), (h) and (i) are repeated. This repeat operation is represented by block (j) in FIG. 7.

Discussing now briefly illustrative armor spray-coating materials which have been found to be very effective for armor-coating selected surfaces in vehicles, such as tanker 35, coating sub-layers 42*a*, 42*c* are preferably formed from a high-elastomeric material which is a chemically-curable, two-part, urethane-blend material formed of a specific urethane compound having not only a very high degree of elasticity, but also a propensity to imbibe somewhat, and to swell and coagulate on contact with, petroleum-based fuel in the event of a puncture leak occurring in a surface which is outside-protected by this urethane material. A very satisfactory elastomeric material for this purpose has been found to be the material sold under the trademark TUFF STUFF®FR made by Rhino Linings USA in San Diego, Calif. Intermediate sub-layer 42*b* herein is preferably a blend of the very same two-part, urethane, elastomeric material used in sub-layers 42*a*, 42*c*, combined with an embedded distribution of liquid-imbiber beads having an affinity for petroleum-based fuel, such as the bead product made by Imbibitive Technologies America, Inc. in Midland, Mich., and sold under product designator IMB230300.

Suitable supplies for all of these blendable, spray-application, armor-coating materials are readily carried as part of the mentioned self-contained armor spray-coating system 36.

Nothing about the present invention involves the specific details of the controls, pressures, flow-rates, etc. appropriate to create an armor coating such as that pictured at 42 in FIG. 6, and it is entirely satisfactory to follow all of the relevant application modalities and instructions given specifically by the makers of the materials just described for the make up of sub-layers 42a, 42b, 42c in illustrative coating 42. While different specific overall layer and sub-layer coating thicknesses may be chosen when one utilizes the materials just described for coating 42, a very suitable set of dimensions includes that set wherein sub-layer 42a has a thickness of about ¼-inches, sub-layer 42b has a thickness of about ⅛-inches, and sub-layer 42c has a thickness of about ¼-inches. These respective sub-layer thicknesses do not form any part of the present invention.

Accordingly, disclosed and offered by the present invention are a unique transform structure, and an associated methodology, for armor spray-coating different kinds of wheeled vehicles out in the field where they are located. This is done by transporting an entire spray-coating transform system to the respective sites of such wheeled vehicles where the system of the invention can be set up and appropriately deployed for very easy and quickly accomplished armor spray-coating.

While a preferred embodiment of the various components of the invention, and a preferred utilization methodology, have been specifically described and illustrated herein, it is appreciated that variations and modifications may be made without departing from the sprit of the invention.

We claim:

1. A mobile transform structure having a tractor-trailer structural mode which is reversibly transformable into a spray-booth structural mode for receiving and armor spray-coating a surface in a subject wheeled vehicle at the location of that vehicle comprising
    trailer structure including an elongate, openable/closeable trailer body having (a) base with opposite lateral sides and a pair of opposite, lateral, trailer-body side panel assemblies, including side portions and top portions, which are reversibly switchable by swinging in a clam-shell manner between (a) a closed, ground-traveling, tractor-towable condition which defines the mentioned tractor-trailer structural mode for the transform structure, and (b) an open, stabilized, ground-anchored condition which defines the mentioned spray-booth structural mode for the transform structure, said side and top panels, in their open conditions, including portions cooperating with said base to form therewith co-extensive, generally co-planar, lateral extensions thereof collectively with said base to form a wheeled-vehicle supporting deck with lateral, personnel walk-around regions,
    selectively stowable-deployable canopy structure carried on said trailer-body in a stowed condition when the trailer-body is in its said closed condition, and deployable with the trailer-body in its said open condition to form a canopied enclosure in cooperation with the trailer body, with said canopied enclosure being designed to receive therein a subject wheeled vehicle having a surface which is to be armor spray-coated, and
    a self-contained, armor spray-coating system also carried on said trailer body, operable, when such a wheeled vehicle is received in said enclosure, to effect armor spray-coating of a selected surface in that vehicle.

2. The transform structure of claim 1, wherein said trailer body has a towing end, and which further includes a stowable-deployable ramp hinged to said base adjacent the trailer body's towing end, swingable from a stowed condition within said body when the body is in its said closed condition, to a deployed, sloping condition when the trailer body is in its said open condition, thus, in the open condition of the trailer body, to accommodate, for a wheeled subject vehicle, wheeling entrance thereof into, and subsequent wheeling exit from, said enclosure in relation to armor spray-coating of a surface in that vehicle.

3. A method for armor spray-coating a surface in a subject wheeled vehicle at the location of that vehicle comprising
    transporting, as a part of a trailer-structure, the closed body of an elongate trailer to the site of the subject wheeled vehicle having a surface intended to be armor spray-coated, wherein the closed body has an elongate base and sides and top, which sides and top are openable, and, when so opened, form, with the elongate base, an elongate deck, thereby providing a walk-around region, and wherein the top forms a perimeter wall partially surrounding the elongate deck,
    opening, in a clam-shell-like manner, the trailer body at that site, and transforming it to an elongate, open-ended spray enclosure adapted for the wheeling-in and wheeling-out of that vehicle, and
    when the subject wheeled vehicle is within the spray enclosure, armor spray-coating a selected surface in that vehicle utilizing an armor spray-coating system which is self-contained on the trailer structure.

4. The method of claim 3, wherein said transporting is performed by a coupleable/uncoupleable tractor coupled to the trailer structure for towing the same with the included trailer body to the site of the subject wheeled vehicle, and said armor spray-coating is preceded by uncoupling of the tractor and the trailer body at the site of the subject vehicle, and then using the just-uncoupled tractor to shift the subject wheeled vehicle into the spray enclosure.

5. The transform structure of claim 1 wherein the canopy structure includes plural support hoops and a canopy surface fabric for deployment over said support hoops, said canopy structure being formed with said support hoops fixed in said side panel assemblies in the top portion thereof, and with said canopy surface fabric deployed over said support hoops.

6. The transform structure of claim 3 wherein said transforming includes attaching plural canopy supports hoops to the open clam-shell-like side and top and covering the hoops with a canopy surface fabric, thus forming an enclosure about and over the deck.

\* \* \* \* \*

UNITED STATES PATENT AND TRADEMARK OFFICE
CERTIFICATE OF CORRECTION

| | | |
|---|---|---|
| PATENT NO. | : 8,061,752 B2 | Page 1 of 1 |
| APPLICATION NO. | : 11/543960 | |
| DATED | : November 22, 2011 | |
| INVENTOR(S) | : Thomas S. Ohnstad et al. | |

It is certified that error appears in the above-identified patent and that said Letters Patent is hereby corrected as shown below:

Column 8, line 22, "and sides and top" should read --and clam-shell-like sides and top--.

Signed and Sealed this
Tenth Day of January, 2012

David J. Kappos
*Director of the United States Patent and Trademark Office*